United States Patent [19]
Lew et al.

[11] Patent Number: 5,275,059
[45] Date of Patent: Jan. 4, 1994

[54] MAGNETIC INDUCTION FLOWMETER

[76] Inventors: Hyok S. Lew; Yon S. Lew, both of 7890 Oak St., Arvada, Colo. 80005

[21] Appl. No.: 890,876

[22] Filed: Jun. 1, 1992

[51] Int. Cl.$^5$ ................................................ G01F 1/00
[52] U.S. Cl. ........................... 73/861.15; 73/861.11
[58] Field of Search .......... 73/861.11, 861.12, 861.13, 73/861.14, 861.15, 861.16, 861.17

[56] References Cited

U.S. PATENT DOCUMENTS

| | | | |
|---|---|---|---|
| 4,137,767 | 2/1979 | Wada | 73/861.17 |
| 4,408,497 | 10/1983 | Suzuki | 73/861.16 |
| 4,704,907 | 10/1987 | Mannherz et al. | 73/861.17 |

Primary Examiner—Richard E. Chilcot, Jr.
Assistant Examiner—R. Biegel

[57] ABSTRACT

A magnetic induction flowmeter has a time-varying magnetic field imposed across the flow passage, and a first and second pairs of electrodes disposed respectively on a first plane dividing the cross section of the flow passage into two equal opposite halves and a second plane offset from the first plane wherein the two electrodes belonging to each pair of electrodes are respectively affixed to the two diametrically opposite sides of the wall of the flow passage, wherein the flow rate of electrically conductive media moving through the flow passage is determined as a function of a differential combination of the electromotive force between the first pair of electrodes and the electromotive force between the second pair of electrodes.

17 Claims, 1 Drawing Sheet

MAGNETIC INDUCTION FLOWMETER

FIELD OF INVENTION

This invention relates to a magnetic induction flowmeter, wherein an alternating magnetic field or pulsed magnetic field with constant direction and the flow of an electrically conductive media moving in directions perpendicular to the magnetic field generates an electromotive force across a pair of electrodes disposed on a plane perpendicular to the magnetic field and respectively affixed to the two opposite sides of the wall of the flow passage, from which electromotive force the flow rate of the media is determined.

BACKGROUND OF INVENTION

The nonintrusive structure of the magnetic induction flowmeters makes them an ideal apparatus for measuring the flow rates of electrically conductive fluids which are corrosive or abrasive. One major short-coming of the magnetic induction flowmeters available at the present time is the high cost arising from the design feature that accurately and precisely controls the imposed magnetic field, whereby the electromotive force induced as a result of electromagnetic interaction between the imposed magnetic field and the motion of the electrically conductive media is directly proportional to the flow rate of the media. As the micro-chip based computer technology has become very widely used and quite inexpensive, an economically priced magnetic induction flowmeter can be constructed by employing the imposed magnetic field generated by a simple and inexpensive method and using a micro-chip based data analysis that isolates the net value of the induced electromotive force generated solely by the moving media.

BRIEF SUMMARY OF INVENTION

The primary object of the present invention is to provide a magnetic induction flowmeter comprising two pairs of electrodes respectively disposed on two different planes perpendicular to the imposed magnetic field, and having two different separation distance between the two electrodes included in each pair of electrodes, wherein the electromotive forces respectively induced across the two electrodes included in each pair of electrodes are arithmetically combined to eliminate the noise and isolate the net value of the electromotive force generated solely by the motion of the electrically conductive media.

Another object is to provide a magnetic induction flowmeter comprising an induction coil encircling at least a portion of flux lines of the imposed magnetic field, wherein the net value of the electromotive force generated solely by the motion of the media is divided by the electromotive force induced in the induction coil in order to obtain the normalized value of the electromotive force generated by the moving media, that is directly proportional to the flow rate of the moving media independent of drift in the intensity of the imposed magnetic field.

These and other objects of the present invention will become clear as the description thereof progresses.

BRIEF DESCRIPTION OF FIGURES

The present invention may be described with a greater clarity and specificity by referring to the following figures.

DESCRIPTION OF ILLUSTRATED EMBODIMENTS

Figure 1:
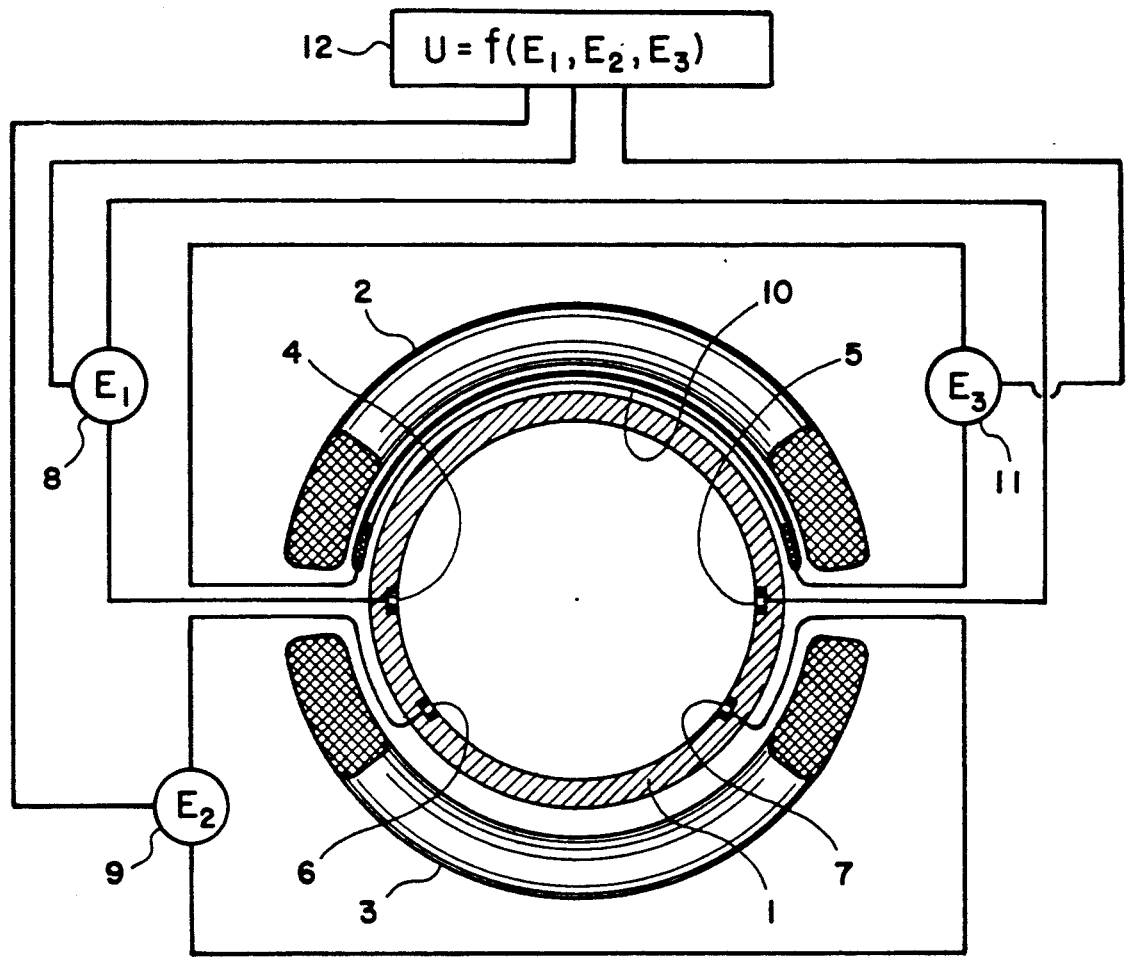
FIG. 1 illustrates a cross section of an embodiment of the magnetic induction flowmeter of the present invention.

In FIG. 1 there is illustrated a cross section of an embodiment of the magnetic induction flowmeter constructed in accordance with the principles of the present invention, which cross section taken along a plane perpendicular to the central axis of the conduit 1 providing the flow passage for an electrically conductive media. The wall of the conduit 1 is made of a nonmagnetizing and nonconducting material such as ceramics or plastics. A pair of electric coils 2 and 3 disposed on two diametrically opposite sides of the cross section of the conduit 1 provides a substantially uniform magnetic field originating from the first coil 2 and terminating at the second coil 3. The electric current energizing the two electric coils 2 and 3 may be an alternating current or pulsed direct current. A first pair of electrodes 4 and 5 disposed on a first plane intermediate the two electric coils 2 and 3, and dividing the cross section of the flow passage into two equal opposite halves are respectively affixed to the two diametrically opposite portions of the wall of the conduit 1. a second pair of electrodes 6 and 7 disposed on a second plane intermediate the two electrical coils 2 and 3, and offset from the first plane including the first pair of electrodes 4 and 5 are respectively affixed to the two diametrically opposite portions of the wall of the conduit 1. It is important that the separation distance between the two electrodes 6 and 7 is significantly less than the separation distance between the two electrodes 4 and 5. The electrodes 4, 5, 6 and 7 may be exposed to the electrically conductive media moving through the conduit 1, or they may be embedded within the wall of the conduit 1 and, consequently, are shielded from the electrically conductive media. A first volt-meter 8 measures the electromotive force between the first pair of electrodes 4 and 5, while a second volt-meter 9 measures the electromotive force between the second pair of electrodes 6 and 7. An induction coil 10 with a single or a plurality of loops is disposed intermediate the first electric coil 2 and the wall of the conduit 1, which induction coil encircles at least a portion of the magnetic flux lines of the magnetic field created by the two electric coils 2 and 3. In an alternative design, the induction coil may include two parts comprising the first coil disposed intermediate the first electric coil 2 and the adjacent wall of the conduit 1, and a second coil disposed intermediate the second electric coil 3 and the adjacent wall of the conduit 1. A third volt-meter 11 measures the electromotive force induced in the induction coil 10.

The magnetic induction flowmeter of the present invention shown in FIG. 1 operates on the following principles : The electromotive force $E_1$ between the first pair of electrodes 4 and 5 is given by equation $$E_1 = C_1 U B d_1 + E_{01}, \qquad (1)$$

where $C_1$ is a constant parameter, U is the media velocity, B is the intensity of the imposed magnetic field, $d_1$ is the separation distance between the two electrodes 4 and 5, and $E_{01}$ is the noise portion of the electromotive force generated by sources other than the motion of the electrically conductive media. The electromotive force between the second pair of electrodes 6 and 7 is given by equation $$E_2 = C_2 U B d_2 + E_{02}, \quad (2)$$

where $C_2$ is a constant parameter either equal to $C_1$ or to $C_1$ times a constant, $d_2$ is the separation distance between the second pair of electrodes 6 and 7, and $E_{02}$ is the noise portion of the electromotive force generated by sources other than the motion of the media, that is equal to $E_{01}$ or to $E_{01}$ times a constant. When equations (1) and (2) are combined to eliminate $E_{01}$ and $E_{02}$, the following equation can be obtained:

$$U = \frac{E_1 - \lambda E_2}{C_2(\eta d_1 - \lambda d_2)B}, \quad (3)$$

where $$\lambda = \frac{E_{01}}{E_{02}} \text{ and } \eta = \frac{C_1}{C_2}. \quad (4)$$

The numerical values of the constant parameters $C_2$, $\lambda$ and $\eta$ appearing in equation (3) are determined by calibrating the flowmeter in accordance with definitions thereof given by equations (1), (2) and (4), which numerical values remain unchanged as they are constant parameters inherent to the structural arrangement of the magnetic induction flowmeter and independent of the electrically conductive media moving through the conduit 1. When the imposed magnetic field has a constant intensity B, the measured value of the magnetic field B or the measured value of $C_2$ times B obtained by calibrating the flowmeter can be substituted into equation (3), and the media velocity U can be determined thereby or by an empirical equivalent thereof, wherein the required algorithm is carried out by a data processor 12. When the imposed magnetic field has an intensity B that is not a constant, the electromotive force $E_3$ induced in the induction coil 10, that is measured by the volt-meter 11, can be used to eliminate the intensity of the magnetic field appearing in equation (3). The electromotive force $E_3$ induced in the induction coil 10 is given by equation $$E_3 = C_3 = \frac{dB}{dt}, \quad (5)$$

where $C_3$ is a constant parameter and t is time. When the alternating current or pulsed direct current energizing the two electric coils 2 and 3 varies in time following a regular curve repeated in time, equation (5) can be written in the form $$E_3 = C_3 \omega B, \quad (6)$$

where $\omega$ is a constant parameter corresponding to the circular frequency of time-varying electric current energizing the two electric coils 2 and 3. When the intensity of the magnetic field B appearing in equation (3) is eliminated by substituting equation (6) thereinto, the following equation can be obtained:

$$U = \frac{C_3 \omega}{C_2(\eta d_1 - \lambda d_2)} \frac{E_1 - \lambda E_2}{E_3}. \quad (7)$$

The equations (3) and (7) can be written in the following forms which are actually used to determine the media velocity from the measured values of the electromotive forces:

$$U = K_1(E_1 - \lambda E_2), \quad (8)$$

for a flowmeter with the magnetic field controlled to a constant averaged value, and, $$U = K_2 \frac{E_1 - \lambda E_2}{E_3}, \quad (9)$$

for a flowmeter with the magnetic field not controlled to a constant averaged value. Of course, the constant parameters $\lambda$, $K_1$ and $K_2$ appearing in equations (8) and (9) are empirically determined by calibrating the flowmeter. The values of the field variables $E_1$, $E_2$, and $E_3$ appearing in equations (8) and (9) may be the peak values, root-mean-square values, or time-averaged values thereof.

Figure 2:
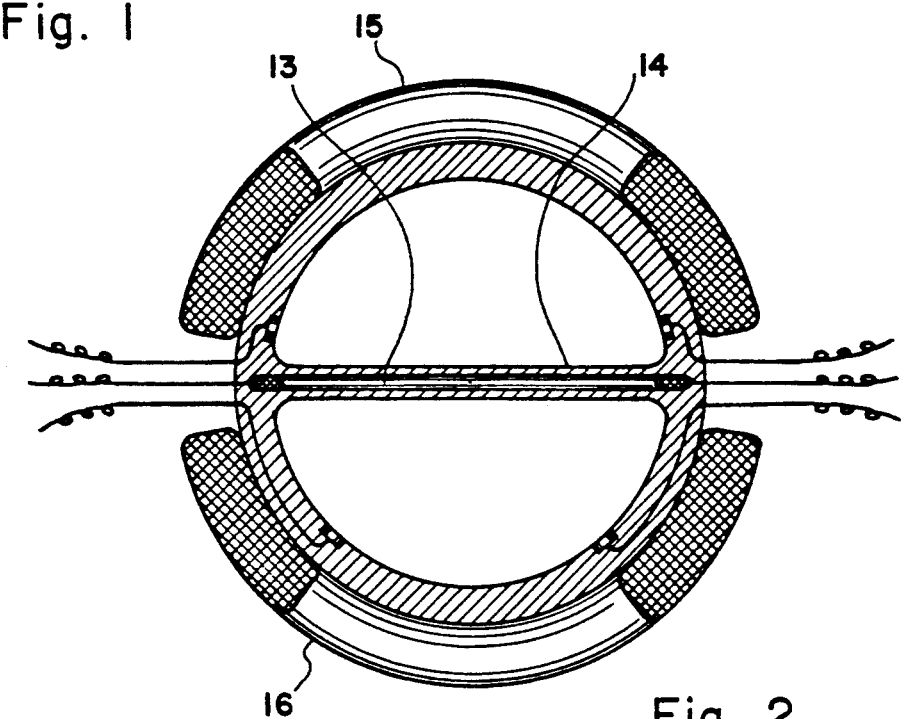
FIG. 2 illustrates a cross section of another embodiment of the magnetic induction flowmeter of the present invention.

In FIG. 2 there is illustrated a cross section of another embodiment of the magnetic induction flowmeter of the present invention, that has essentially the same construction as the embodiment shown in FIG. 1 with one exception, that is the induction coil 13 embedded within "a planar member 14 disposed on a plane parallel to the direction of fluid flow". intermediate the two electric coils 15 and 16), and dividing the cross section of the flow passage into two equal opposite halves. This embodiment operates on the same principles as those set forth by equations (8) and (9). The embodiments of the magnetic induction flowmeter of the present invention shown in FIGS. 1 and 2 may be applied as an in-line flowmeter or an insertion flowmeter.

While the principles of the present invention have now been made clear by the illustrative embodiments, there will be many modifications of the structures, arrangement, proportions, elements and materials, which are immediately obvious to those skilled in the art and particularly adapted to the specific working environments and operating conditions, in the practice of the invention without departing from those principles. It is not desired to limit the invention to the particular illustrated embodiments shown and described, and accordingly, all suitable modifications and equivalents may be regarded as falling within the scope of the invention as defined by the claims which follow.

The embodiments of the invention, in which an exclusive property or privilege is claimed, are defined as follows:

1. An apparatus for measuring flow rate of electrically conductive media comprising in combination:
   a) a flow passage;
   b) means for imposing a magnetic field perpendicular to flow direction across a cross section of the flow passage;
   c) a first pair of electrodes disposed on a first plane passing through the cross section of the flow passage and intersecting the magnetic field, and respectively affixed to two opposite portions of wall of the flow passage;
   d) a second pair of electrodes disposed on a second plane passing through the cross section of the flow passage and intersecting the magnetic field, and respectively affixed to two opposite portions of the wall of the flow passage, wherein separation distance between said second pair of electrodes is substantially less than separation distance between said first pair of electrodes;

e) means for measuring electromotive force between said first pair of electrodes; and f) means for measuring electromotive force between said second pair of electrodes.

2. An apparatus as defined in claim 1 wherein said combination includes means for determining flow rate of the electrically conductive media moving through the flow passage as a function of a differential combination of the electromotive force between said first pair of electrodes and the electromotive force between said second pair of electrodes.

3. An apparatus as defined in claim 1 wherein said combination includes an induction coil disposed within the magnetic field and encircling at least a portion of magnetic flux lines of the magnetic field, and means for measuring electromotive force induced in said induction coil.

4. An apparatus as defined in claim 3 wherein said combination includes means for determining flow rate of the electrically conductive media moving through the flow passage as a function of ratio of a differential combination of the electromotive force between said first pair of electrodes and the electromotive force between said second pair of electrodes to the electromotive force induced in said induction coil.

5. An apparatus as defined in claim 3 wherein said induction coil is disposed exteriorly to the wall of the flow passage.

6. An apparatus as defined in claim 5 wherein said combination includes means for determining flow rate of the electrically conductive media moving through the flow passage as a function of ratio of a differential combination of the electromotive force between said first pair of electrodes and the electromotive force between said second pair of electrodes to the electromotive force induced in said induction coil.

7. An apparatus as defined in claim 3 wherein said induction coil is disposed within a planar member disposed on a plane parallel to the flow direction and extending across the cross section of the flow passage.

8. An apparatus as defined in claim 5 wherein said combination includes means for determining flow rate of the electrically conductive media moving through the flow passage as a function of ratio of a differential combination of the electromotive force between said first pair of electrodes and the electromotive force between said second pair of electrodes to the electromotive force induced in said induction coil.

9. An apparatus for measuring flow rate of electrically conductive media comprising in combination:

a) a flow passage;

b) means for imposing a magnetic field perpendicular to flow direction across a cross section of the flow passage;

c) a pair of electrodes disposed on a plane passing through the cross section of the flow passage and intersecting the magnetic field, and respectively affixed to two opposite portions of wall of the flow passage;

d) an induction coil disposed within the magnetic field and encircling at least a portion of magnetic flux lines of the magnetic field;

e) means for measuring electromotive force between said pair of electrodes; and f) means for measuring electromotive force induced in said induction coil; and g) means for determining flow rate of the electrically conductive media moving through the flow passage as a function of ratio of the electromotive force between said pair of electrodes to the electromotive force induced in said induction coil.

10. An apparatus as defined in claim 9 wherein said induction coil is disposed exteriorly to the wall of the flow passage.

11. An apparatus as defined in claim 10 wherein said combination includes means for determining flow rate of the electrically conductive media moving through the flow passage as a function of ratio of the electromotive force between said pair of electrodes to the electromotive force induced in said induction coil.

12. An apparatus as defined in claim 9 wherein said induction coil is disposed within a planar member disposed on a plane parallel to the flow direction and extending across the cross section of the flow passage.

13. An apparatus as defined in claim 12 wherein said combination includes means for determining flow rate of the electrically conductive media moving through the flow passage as a function of ratio of the electromotive force between said pair of electrodes to the electromotive force induced in said induction coil.

14. An apparatus for measuring flow rate of electrically conductive media comprising in combination:

a) a flow passage;

b) means for imposing a magnetic field perpendicular to flow direction across a cross section of the flow passage;

c) a first pair of electrodes disposed on a first plane passing through the cross section of the flow passage and intersecting the magnetic field, and respectively affixed to two opposite portions of wall of the flow passage;

d) a second pair of electrodes disposed on a second plane passing through the cross section of the flow passage and intersecting the magnetic field, and respectively affixed to two opposite portions of the wall of the flow passage, wherein separation distance between said second pair of electrodes is less than separation distance between said first pair of electrodes;

e) means for measuring electromotive force between said first pair of electrodes;

f) means for measuring electromotive force between said second pair of electrodes;

g) an induction coil disposed within the magnetic field and encircling at least a portion of magnetic flux lines of the magnetic field; and h) means for measuring electromotive force induced in said induction coil.

15. An apparatus as defined in claim 14 wherein said combination includes means for determining flow rate of electrically conductive media moving through the flow passage as a function of ratio of a differential combination of the electromotive force between said first pair of electrodes and the electromotive force between said second pair of electrodes to the electromotive force induced in said induction coil.

16. An apparatus as defined in claim 15 wherein said induction coil is disposed exteriorly to the wall of the flow passage.

17. An apparatus as defined in claim 16 wherein said induction coil is disposed within a planar member disposed on a plane parallel to flow direction and extending across the cross section of the flow passage.

* * * * *